United States Patent [19]

Braglia

[11] Patent Number: 4,923,496
[45] Date of Patent: May 8, 1990

[54] METHOD OF FABRICATING FLUORIDE-GLASS INTEGRATED OPTICAL WAVEGUIDES

[75] Inventor: Marco Braglia, Turin, all of Italy

[73] Assignees: Societa' Cavi Pierelli S.p.A.; Sirti S.p.A., both of Milan; SIP-Societa Italiana Per L'Esercizio Telecommunicazione P.A., Torino, all of Italy

[21] Appl. No.: 360,399

[22] Filed: Jun. 2, 1989

[30] Foreign Application Priority Data

Jul. 4, 1988 [IT] Italy .................. 67630 A/88

[51] Int. Cl.⁵ ............................................ C03C 21/00
[52] U.S. Cl. .................................. 65/30.13; 65/30.1; 65/30.14; 65/DIG. 16
[58] Field of Search .................. 65/30.13, 30.14, 30.1, 65/DIG. 16

[56] References Cited

U.S. PATENT DOCUMENTS

| 4,263,030 | 4/1981 | Kobayashi et al. | 65/DIG. 16 |
| 4,680,044 | 7/1987 | Pastor | 65/DIG. 16 |
| 4,756,733 | 7/1988 | Houde-Walter et al. | 65/30.13 |

FOREIGN PATENT DOCUMENTS

| 0747981 | 8/1970 | Belgium | 65/30.14 |
| 0056042 | 4/1980 | Japan | 65/30.14 |
| 0003039 | 1/1984 | Japan | 65/DIG. 16 |
| 0737377 | 6/1980 | U.S.S.R. | 65/30.14 |
| 1130543 | 12/1984 | U.S.S.R. | 65/30.13 |

Primary Examiner—Arthur Kellogg
Attorney, Agent, or Firm—Herbert Dubno

[57] ABSTRACT

Integrated optical guides are fabricated on fluoride glass plates by exposing such plates to an atmosphere of a gaseous halogen other than fluorine, or of a compound capable of generating such a halogen, at high temperature and pressure, so as to obtain a ion exchange between fluoride ions in the glass and halide ions.

4 Claims, 1 Drawing Sheet

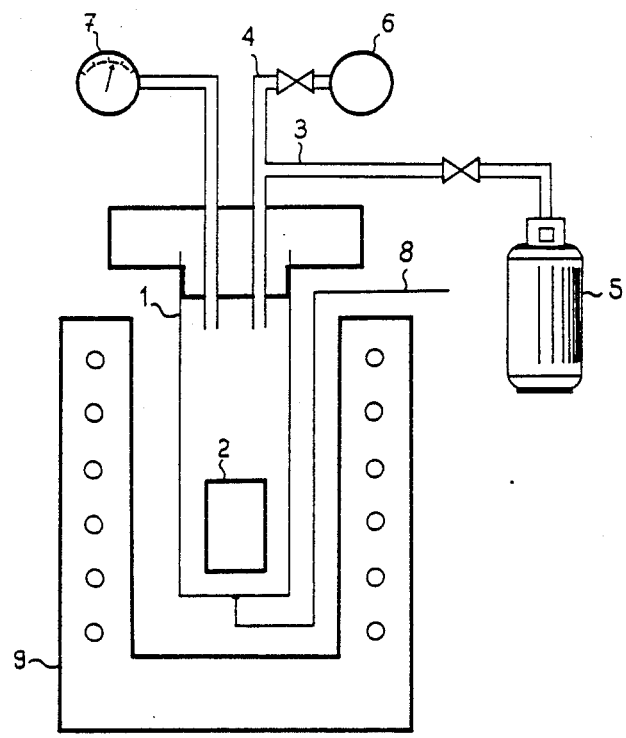

METHOD OF FABRICATING FLUORIDE-GLASS INTEGRATED OPTICAL WAVEGUIDES

DESCRIPTION

The present invention concerns integrated optical components for optical telecommunications systems, and more particularly it relates to a method of fabricating fluoride-glass integrated optical waveguides.

Research on materials for optical telecommunications presenting lower and lower attenuations has led to the development of fluoride glasses, and more particularly of fluorozirconate glasses, which exhibit, in the wavelength region from 2 to 12 μm (medium infrared), attenuations of the order of $10^{-3}$ dB/Km, i.e. attenuations inferior by two orders of magnitude to those of conventional silica glasses. The use of optical fibres made of such glasses allows design of systems with very highly spaced repeaters, with all resulting technical and economical advantages.

The use of fluoride glasses for fibre fabrication implies the use of the same materials for fabricating integrated-optics components (lenses, beam splitters, wavelength multiplexers/demultiplexers, and so on) effecting optical signal processing. All these components comprise planar optical guides, obtained by inducing suitable local refractive-index variations in the fluoride glass substrate.

A method of fabricating optical waveguides on these glasses is described e.g. in published European Patent Application EP-A-261672 (CSELT). According to that prior art, a local refractive-index increase is obtained in a fluorozirconate substrate by immersion of the substrate, suitably masked so as to let free the only regions where the optical waveguide is to be obtained, into a bath containing the dopant, which is a cation bonded to a fluoride. The dopant diffusion inside the glass is promoted by a high bath temperature (150° C. in an exemplary embodiment). Such method is not of general use, since at such temperatures certain fluoride glasses may undergo chemical attacking and spoiling by the materials of the dopant-containing bath.

The present invention, on the contrary, suggests a method wherein the local refractive-index variation is obtained without using baths of materials which, at high temperatures, can attack and spoil the substrate, and thus waveguides can be obtained on a wider group of said glasses.

According to the present invention there is provided a method wherein a fluoride glass plate is exposed in a reactor to a pressurized atmosphere of a gaseous halogen other than fluorine, or of a compound capable of generating such halogen, at a lower temperature than the vitreous transition temperature of the plate material and for a time preventing crystallisation phenomena from arising, thereby effecting a ion exchange between fluoride ions in the glass and halide ions and an increase of the refractive index of the glass in the glass regions where such an exchange takes place.

Such a gaseous halogen is preferably chlorine.

It is known from the paper "Preparation of single-mode and multimode graded-index fluoride-glass optical fibres using a reactive vapour transport process", presented by D. C. Tran, M. J. Burk, G. H. Sigel and K. H. Levin at OFC Meeting '84, New Orleans, Jan.23-25, 1984, Memory TUG2, a method of fabricating fluoride-glass optical fibres, wherein chlorine is passed inside a fluoride-glass tube heated to a temperature close to vitreous transition temperature, causing chlorine diffusion into the tube material. Thus a higher refractive-index region is obtained, which, after preform drawing and collapsing, forms the fibre core. This method does not yield satisfactory practical results, since chlorine penetration is not sufficient to provide the guiding power required for a fibre: this is due i. a. to the fact that the operation takes place under dynamic conditions and at a temperature close to vitreous transition temperature, and hence the tube cannot be pressurised so as to increase such a penetration, since too high a pressure would cause tube deformation.

Such a problem is solved by the present invention which operates under static conditions and at lower temperature than vitreous transition temperature: hence the pressure can be sufficiently high to cause ion exchange between fluorine and halogen, and not only a sere diffusion.

The invention will be better understood with reference to the annexed drawing showing an apparatus for performing the method.

In FIG. 1 the apparatus comprises a conventional reactor 1, where there will be placed a glass plate 2 on which the integrated optical guides are to be made. The reactor is connected through ducts 3, 4 to a source 5 of a gaseous halogen other than fluorine, in particular chlorine, or of a gas capable of generating such a halogen (in particular CC14, SOC12, various freons (registered trade mark), etc.), and to a vacuum pump 6, and is associated with a gauge 7 for pressure control inside the reactor and with a thermocouple 8 for temperature control. A furnace 9 allows reactor 1 and plate 2 contained therein to be heated to the temperatures demanded by the treatment. For drawing simplicity the various valves for gas flow control have not been shown.

For such a treatment, plate 2, duly polished by conventional techniques, is introduced into reactor 1, which is washed with the halogen emitted by source 5. Pressure and temperature conditions under which such washing takes place do not affect the treatment. Thus the reactor could even already be inside furnace 9.

Once the washing is over, the halogen used is exhausted, the reactor is hermetically closed and halogen is introduced till the desired pressure is attained. At the same time, the reactor is heated till the plate attains the desired temperature, which is not higher than vitreous transition temperature. The plate remains exposed to the chlorine atmosphere, under the temperature and pressure conditions attained, for several hours. During this treatment a ion exchange takes place between fluorine and chlorine (or other halogen), thanks to oxidation of fluoride ions present in the matrix, which are converted to gaseous fluorine, and reduction of chlorine (or other halogen) to chloride (or other halide) ions.

Chlorine pressure, temperature inside the reactor and treatment time determine chlorine penetration depth into plate 2, and hence will be chosen depending on the glass characteristics and the desired refractive index variations. Specific values of pressure, temperature and treatment time will result from the following examples.

It is to be noted that there is an upper limit to the temperature, given by the vitreous transition temperature, while theoretically no lower limit exists: of course, since generally the lower the temperature, the longer the time required to obtain the desired refractive index variation, a temperature will be chosen allowing a reasonably short treatment duration, compatible with industrial production requirements. Besides, as it is well known to the skilled in the art, when a glass is subjected to a thermal treatment, crystallization phenomena may arise after a certain time, depending not only on treatment temperature and time, but also on glass composition and on the previous thermal treatments the material has undergone for glass formation. Therefore, generally, a combination of temperature and treatment duration which positively prevents occurrence of such phenomena has to be chosen for a given sample. In the tests carried out, temperatures some ten degrees lower than vitreous transition temperature and treatment times ranging from some ten hours to some hundred hours have proved convenient.

By introducing into reactor 1 plate 2 as it has been prepared, without masking, there is a ion exchange inside a surface layer of the whole plate, and the faces enriched with chlorine act as planar optical guides.

In case optical guides with a predetermined geometrical configuration are desired, a masking of the faces of plate 2 is necessary prior to treatment with halogen. This is an operation which is commonly carried out when implementing integrated optical guides. In the present invention, when choosing the masking material, it is to be considered that such material has to be exposed to a halogen atmosphere at a rather high temperature (even above 200° C.), which can give origin to mask stability problems, and that fluoride glasses are attacked by many agents in common use to remove the mask after the treatment which has given rise to the refractive index variations.

Some examples of the invention will now be described.

EXAMPLE 1

Glass plates having the following composition (molar percentages) were prepared:

| $ZrF_4$ | $BaF_2$ | $LaF_3$ | $AlF_3$ | NaF |
|---|---|---|---|---|
| 53 | 24 | 4 | 4 | 15 | by techniques such as described by M. Braglia, G. Cocito, M. Ferraris, G. Grego, E. Modone, G. Parisi in the article entitled "Fluorozirconate glass preparation", CSELT Technical Reports, Vol. 14, N. June 3, 1976, pages 171-173, and were polished so as to give the surface a finishing degree of optical quality. This glass has a vitreous transition temperature of 276° C. and a refractive index $n1 = 1,5053$ at a wavelength of 632,8 nm. Said wavelength has been chosen for the tests since the sources (He-Ne lasers) are readily available and visual observation of the guiding properties after treatment is possible.

The plates were submitted to a treatment with chlorine in reactor 1: in all tests carried out, the chlorine pressure was maintained at about 120 kPa, while treatment duration and temperature inside the reactor were varied. After treatment, the plates did not exhibit surface spoiling; spectroscopic measurements in the ultraviolet, visible and infrared regions did not reveal glass transmittivity changes, in the range 0,2 to 8 μm. Processed samples were then optically characterized by the well known prism-coupler method to recognize the presence of guiding effects, using the source at 632,8 nm. Guided modes were detected both for TE and TM polarization. The following table 1 lists the values of temperature T and duration t of the treatment and refractive index n2 for mode TE in the region wherein ion exchange occurred, for some of the processed samples.

TABLE 1

| Sample | T(°C.) | t(h) | $n_2$ |
|---|---|---|---|
| 1 | 241 | 20 | 1.50655 |
| 2 | 260 | 63 | 1.50909 |
| 3 | 260 | 140 | 1.51978 |

EXAMPLE 2

In another test, a sample of glass with the following composition (in molar percentages)

| $ZrF_4$ | $BaF_2$ | $LaF_3$ | $AlF_3$ | NaF |
|---|---|---|---|---|
| 53 | 20 | 4 | 3 | 20 | was submitted to the same treatment as sample 3 of Example 1.

Vitreous transition temperature of the used sample was 266° C., and the refractive index before treatment was $n1 = 1.5000001$. Also this sample exhibited guiding properties after treatment, due to the fact that the refractive index for mode TE in the processed regions was $n_2 = 1.50633$.

It is clear that what described has been given only by way of a non-limiting example. Variations and modifications are possible without going out of the scope of the present invention: namely fluorozirconate glasses of different compositions or other fluoride glasses can be treated, and the ions used for the exchange can be bromide or iodide ions, instead of chloride ions, produced through reduction of the corresponding gases or decomposition of compounds capable to generate them (for instance, some freons).

I claim:

1. A method of fabricating fluoride-glass integrated optical guides, characterized in that a fluoride-glass plate is exposed in a reactor to a pressurised atmosphere of a gaseous halogen other than fluorine, or of a compound capable of generating such a halogen, at a temperature lower than vitreous transition temperature of the plate material and for a period of time preventing occurrence of crystallisation phenomena, so as to effect a ion exchange between fluoride ions in glass and halide ions and obtain an increase in the refractive index in the glass regions wherein such an exchange takes place.

2. A method as claimed in claim 1, characterized in that said fluoride glass is a fluorozirconate glass.

3. A method as claimed in claim 2, characterized in that said fluorozirconate glass also comprises barium, lanthanum, aluminum and sodium fluorides.

4. A method as claimed in claim 1, characterized in that said halide ions are chloride ions.

* * * * *